United States Patent Office 3,476,739
Patented Nov. 4, 1969

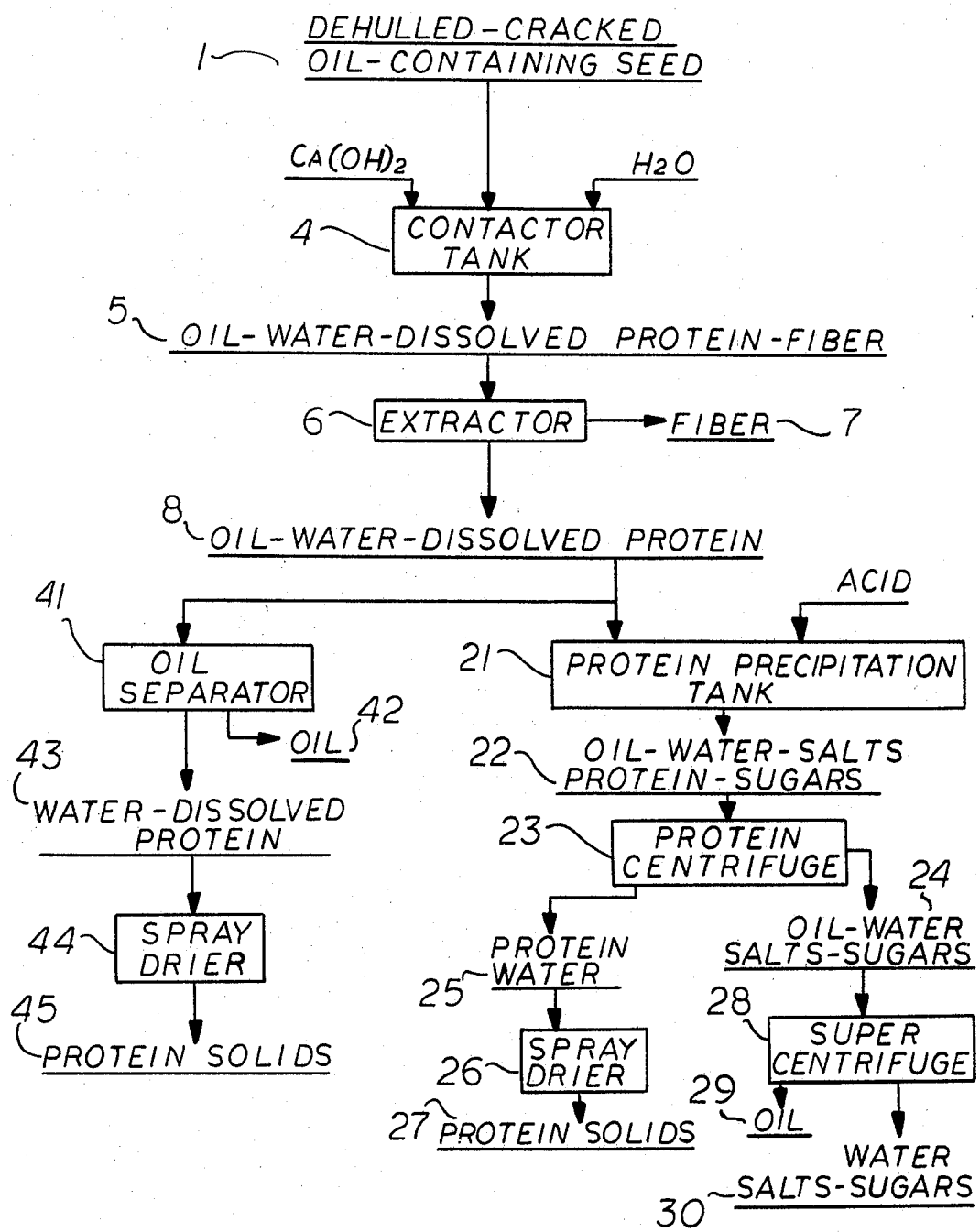

3,476,739
RECOVERY OF PROTEIN AND OIL FROM OIL-CONTAINING SEEDS BY TREATMENT WITH A SATURATED SOLUTION OF CALCIUM HYDROXIDE
James J. Liggett, Libertyville, Ill., assignor of one-half to Erving S. Sternberg, Park Ridge, Ill.
Filed Mar. 4, 1968, Ser. No. 710,183
Int. Cl. A23j 1/14
U.S. Cl. 260—123.5         8 Claims

ABSTRACT OF THE DISCLOSURE

Oil-containing seeds, especially sesame, are treated in an aqueous system containing saturated calcium hydroxide to recover both protein and oil.

BACKGROUND OF THE INVENTION

This invention relates to the fatty oils obtained from plants, and more particularly to a method of extracting oil and protein from oil-containing seeds in an aqueous processing system.

Generally, in commercial processes for recovering protein and oil from oil-containing seeds, the oil is first extracted with an organic solvent or the seeds are treated in some other manner to remove the oil before any attempt is made to recover the protein solids. This is done because the protein solids are normally recovered in the presence of water and the presence of the oil during the processing of the protein solids with water complicates the recovery of the protein solids. One of the difficulties is the formation of an emulsion between the oil and the water used in processing the protein solids. Because of such problems it has not heretofore been considered feasible to attempt to recover the protein solids without initially removing the oil before mixing with water. Moreover, in most commercial processes the oil is extracted with an organic solvent in order to insure practically complete removal. In this type of process, the solvent is an expensive factor and must be recovered. Such recovery also requires additional apparatus which adds to the cost of the process.

SUMMARY OF THE INVENTION

This invention provides a process for recovering protein and oil from oil-containing seeds in which dehulled, cracked seeds are contacted with a saturated aqueous solution of calcium hydroxide to produce a mixture containing oil, water, dissolved protein and fiber. After the fiber has been separated, oil and protein are recovered from the residual mixture.

One of the objects of the present invention is to provide a new and improved process for recovering oil and protein from oil-containing seeds without removing the oil from such seeds initially.

Another object of the invention is to provide a new and improved process for recovering oil and protein from oil-containing seeds wherein the seeds are initially dehulled and either cracked, flaked or crushed and mixed with water containing dissolved calcium hydroxide, and the fiber, oil and protein are later removed from the mixture.

A further object of the invention is to provide a process of the type described in which the oil is separated from a mixture of oil and water-dissolved protein and the protein is thereafter recovered from the water.

An additional object of the invention is to provide a process of the type described in which the mixture of oil and water-dissolved protein is subjected to treatment with an acid to precipitate the protein and thereafter the oil and protein are separated and recovered.

Other objects and advantages of the invention will appear from the following description when taken in conjunction with the accompanying drawing in which the process is described diagrammatically.

BRIEF DESCRIPTION OF THE DRAWING

As shown in the drawing, the process is carried out by mixing dehulled, cracked or crushed oil-containing seeds 1 with water containing dissolved calcium hydroxide in a contactor tank 4 to produce a mixture 5 containing oil, water, dissolved protein and fiber. The fiber 7 is separated from this mixture and the oil and protein are then separated from the residual mixture 8. The separation of the fiber can be effected by passing the initial mixture 5 through a suitable extractor 6, e.g. a centrifuge or expeller. The fiber content of the raw product will depend upon the seed being treated, in the case of sesame seed being approximately 4–8%.

The separation of the oil and protein can be carried out in one of two ways. In the first method, the mixture 8 from which the fiber has been separated is passed into a protein precipitation tank 21. At this point, due to the presence of the calcium hydroxide, the pH of the mixture is around 10 or 11. In order to separate the protein, an acid is added to lower the pH to the isoelectric point of the protein which is usually around pH 4 to 5. At the isoelectric point the protein precipitates and the resultant solution 22 contains oil, water, salts, protein and sugars. The precipitate can be separated by filtration or by passing it through a centrifuge 23. The protein-water mixture 25 can be converted to a dry solid form in any suitable manner, preferably by spray drying in a conventional spray drier 26. The resultant product comprising protein solids 27 is useful in the food industry and for many other purposes.

After the removal of the protein precipitate the residue 24 contains oil, water, salts and sugars. The oil can be separated from this residue, in any suitable manner, for example, by passing the residue through a centrifuge 28. In this way, a highly purified oil 29 is obtained. The aqueous liquid 30 from the centrifuge can be discarded or used in other processing or subjected to drying, for example, spray drying, to recover the salts and sugars.

In a second type of process, the liquid mixture 8 containing oil, water and dissolved protein after removal of the fiber is passed to an oil separator 41 where the oil 42 is removed. The residual liquid mixture 43 consists of water and dissolved protein. The dissolved protein in this case is calcium proteinate which can be recovered as protein solids 45 by drying in a spray drier 44 or in any other suitable manner. It can be used as calcium proteinate in foods and in industrial applications.

The invention will be further illustrated but is not limited by the following examples which give the best mode contemplated for the practice of the invention and in which the quantities are stated in parts by weight unless otherwise indicated.

DESCRIPTION OF THE PREFERRED EMBODIMENTS

Example I 250 parts by weight of crushed wet sesame seed, based on the dry weight of the seed, are mixed thoroughly in a stainless steel container equipped with a sweep-type agitator for 5–30 minutes with 740 parts of water containing 10 parts calcium hydroxide USP grade (a saturated Ca(OH)$_2$ solution), the water being heated to 180° F. The mixture was then pumped through a centrifuge with only slight pressure. The liquid phase of the mixture from the centrifuge was then passed to a separator tank where it was allowed to settle and the oil was separated by decantation. The aqueous phase containing water and calcium proteinate (basic salt) was spray dried to recover the protein solids as calcium proteinate.

Example II

The process was the same as in Example I except that after separation of the fiber in the extractor the mixture of oil, water and dissolved protein was passed to a protein precipitation tank where 15 parts lactic acid were added to adjust the pH to the isoelectric point where the protein coagulated and precipitated. The protein was then separated in a centrifuge and thereafter spray dried to recover the protein solids as protein lactate (acid salt). The oil and water phase from the centrifuge was passed to another centrifuge where the oil phase was separated from the aqueous phase and recovered. The solids in the aqueous phase can be recovered by spray drying or the aqueous phase can be recycled to the initial mixing tank and used to replace a part of the water. If the latter step is adopted, eventually when the aqueous phase becomes too concentrated in salts and sugars, it is either discarded or the salts and sugars are recovered as such.

In a similar manner the process can be carried out using other types of oil seeds instead of sesame seeds. Examples of other seeds are sunflower seed, safflower seed, palm kernels and spice oil seeds, e.g., mustard, clover, and the like.

In either process, the solids concentration in the initial mixing tank is subject to variation but is preferably within the range of 10% to 25% by weight. Preferably the water will be heated so that the temperature of the mixture in the contactor tank will be in the range of from 160°–180° F. Most advantageously, the mixture will contain excess calcium hydroxide, i.e., 1–15% calcium hydroxide to maintain saturation of the solution.

Where the protein is precipitated by adding an acid, the amount of acid is preferably sufficient to produce a pH within the range of 4 to 7 and in most cases within the range of 4 to 5.

The invention is not limited to the use of any particular acid for precipitating protein. Where the products are to be employed in foods, it is desirable however, to use an edible acid, such as lactic acid or hydrochloric acid. If hydrochloric acid is used, it is preferable to employ about a 10% by weight solution. Additional acids which are suitable are phosphoric, acetic, citric, tartaric and the like.

Where the desired products are spray dried, this is preferably accomplished in a conventional manner at temperatures within the range of 400° F. to 550° F.

Mixtures of various types of seeds can be employed in order to obtain mixed proteins derived from different sources. The advantage of this is that not all proteins are found in each type of seed. The proteins prepared in accordance with the invention can also be mixed with other proteins after they have been produced in accordance with the present process. Thus, an excellent mixture is obtained by mixing one part by weight of sesame protein with two parts by weight of soya protein. In this way, a final product containing the proper amino acids is prepared.

It is believed that the invention is made possible by the use of calcium hydroxide in the initial processing of the dehulled, cracked or crushed seed with water. Ordinarily it might be expected that the presence of both oil and water in the same mixture would result in emulsification but the calcium hydroxide is present in amount to cause demulsification. Hence, instead of obtaining an oil and water emulsion which would be difficult to separate, the oil does not emulsify with the water and can readily be separated. This result could not be obtained by using other alkalis, such as sodium hydroxide or potassium hydroxide which form soluble salts with fatty acids that act as emulsifiers.

The methods of Examples I and II were both found to produce a clear, near-white, oil product having a mild characteristic sesame aroma and taste. Analysis of a typical oil extracted from sesame seed is set forth below.

Composition—Fatty acids (percent):
 Palmitic, 7.8; Stearic, 4.7; Arachidic, 0.4; Linoceric, 0.1; Oleic, 49.3; Linoleic, 37.4.
Iodine No., 110.
Saponification No., 190.
Peroxide value, 0.63.

The oil which is obtained in the present process is in a pure form containing the naturally occurring antioxidants sesamin, sesamol and sesamolin. However, if desired, it can be further refined, for example, by passing it through activated charcoal or by steam distilling it to produce a super refined oil.

The utility of protein solids of the type produced in accordance with the invention is the same as the utility of protein solids obtained by other processes, for example, they can be employed in foods, in making bakery products and as protective colloids in oil-in-water paint compositions. They can also be used in paper coating and in other arts where vegetable proteins have heretofore been employed.

As can readily be seen from the above, the present invention provides a method for obtaining high protein solids and high quality oil from oil-containing seeds. Treatment of sesame seeds in the manner of the aforementioned examples has resulted in percent recoveries of the oil in the liquid phase in the range of from 91–97%. Recovery of the solids in the solids phase was approximately 85%.

It is to be understood that the above described processes for recovering protein and oil from oil-containing seeds are but illustrative of the application of the principles of this invention and that numerous other modifications of the treating methods of the foregoing examples may be devised by those skilled in the art without departing from the spirit and scope of the invention.

The invention is hereby claimed as follows:

1. A process for recovering protein and oil from oil-containing seeds which comprises contacting oil-containing seeds with a saturated aqueous solution of calcium hydroxide to produce a mixture containing oil, water, dissolved protein and fiber, separating the fiber from said mixture, and separating oil and protein from the residual mixture.

2. A process as claimed in claim 1 in which said oil-containing seeds are dehulled, cracked, sesame seeds.

3. A process as claimed in claim 1 in which said residual mixture is treated with an acid in an amount sufficient to cause precipitation of said protein, and said protein is separated from said mixture, whereafter the oil is recovered from the residue.

4. A process as claimed in claim 1 in which the solids concentration of the mixture of oil-containing seeds and calcium hydroxide solution is in the range of 10% to 25% by weight.

5. A process as claimed in claim 1 in which the concentration of calcium hydroxide in the mixture is in the range of 1% to 15% by weight and the solution has a pH in the range of 7.5–11.

6. A process as claimed in claim 3 in which the acid used is lactic acid, hydrochloric acid or acetic acid, or mixtures thereof.

7. A process as claimed in claim 1 in which the protein is recovered as calcium proteinate.

8. A process as claimed in claim 1 in which the protein is recovered as protein lactate, protein chloride or protein acetate.

References Cited

UNITED STATES PATENTS

| | | | |
|---|---|---|---|
| 1,962,808 | 6/1934 | Cone et al. | 106—146 |
| 2,233,439 | 3/1941 | Wahlforss et al. | 260—123.5 |
| 2,304,099 | 12/1942 | Julian et al. | 260—123.5 |
| 2,405,438 | 8/1946 | Levin | 252—3 |

(Other references on following page)

UNITED STATES PATENTS

| | | | |
|---|---|---|---|
| 2,607,767 | 8/1952 | Vassel | 260—123.5 |
| 2,762,820 | 9/1956 | Sugarman | 260—412.3 |
| 2,785,155 | 3/1957 | Anson et al. | 260—123.5 |

OTHER REFERENCES

Journal of the American Oil Chemists' Society, February 1953, vol. XXX pp. 88–89 Pominski.

WILLIAM H. SHORT, Primary Examiner

H. SCHAIN, Assistant Examiner

U.S. Cl. X.R.

99—17; 106—154; 260—412.3